(12) United States Patent
Chakraborty et al.

(10) Patent No.: US 10,344,203 B2
(45) Date of Patent: Jul. 9, 2019

(54) METHODS AND WORKING FLUIDS FOR RECOVERING A HYDROCARBON MATERIAL CONTAINED WITHIN A SUBTERRANEAN FORMATION

(71) Applicant: Baker Hughes Incorporated, Houston, TX (US)

(72) Inventors: Soma Chakraborty, Houston, TX (US); Michael H. Johnson, Katy, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 15/719,926

(22) Filed: Sep. 29, 2017

(65) Prior Publication Data

US 2018/0037808 A1 Feb. 8, 2018

Related U.S. Application Data

(62) Division of application No. 14/520,993, filed on Oct. 22, 2014, now abandoned.

(51) Int. Cl.
*E21B 43/24* (2006.01)
*C09K 8/592* (2006.01)

(52) U.S. Cl.
CPC .............. *C09K 8/592* (2013.01); *E21B 43/24* (2013.01); *C09K 2208/08* (2013.01); *C09K 2208/10* (2013.01)

(58) Field of Classification Search
None
See application file for complete search history.

(56) References Cited

U.S. PATENT DOCUMENTS

| 4,142,108 | A | 2/1979 | Matthews |
| 9,581,001 | B2 | 2/2017 | Mazyar et al. |
| 2008/0087427 | A1 | 4/2008 | Kaminsky et al. |
| 2008/0217008 | A1* | 9/2008 | Langdon ................. E21B 36/02 166/270 |
| 2009/0036605 | A1 | 2/2009 | Ver Meer |
| 2012/0067568 | A1* | 3/2012 | Palmer ................... E21B 36/02 166/256 |
| 2012/0216990 | A1 | 8/2012 | Quintero et al. |

(Continued)

FOREIGN PATENT DOCUMENTS

WO 2013169242 11/2013

OTHER PUBLICATIONS

Farid et al., A review on Phase Change Energy Storage: Material and Applications, Energy Conversion and Management, vol. 45, (2004), pp. 1597-1615.

(Continued)

*Primary Examiner* — Andrew Sue-Ako
(74) *Attorney, Agent, or Firm* — TraskBritt

(57) ABSTRACT

A method of recovering a hydrocarbon material from a subterranean formation comprises forming a working fluid comprising substantially solid particles and an at least partially gaseous base material, the substantially solid particles exhibiting a greater heat capacity than the at least partially gaseous base material. The working fluid is introduced into a subterranean formation containing a hydrocarbon material to heat and remove the hydrocarbon material from the subterranean formation. An additional method of recovering a hydrocarbon material from a subterranean formation, and a working fluid are also described.

9 Claims, 1 Drawing Sheet

(56) References Cited

U.S. PATENT DOCUMENTS

| | | | |
|---|---|---|---|
| 2013/0043028 A1* | 2/2013 | Chakraborty | C09K 8/03 |
| | | | 166/302 |
| 2013/0045897 A1* | 2/2013 | Chakraborty | B82Y 30/00 |
| | | | 507/117 |
| 2013/0140240 A1 | 6/2013 | Mazyar | |
| 2013/0192825 A1 | 8/2013 | Parsche | |
| 2013/0200299 A1* | 8/2013 | Mazyar | E21B 43/128 |
| | | | 252/75 |
| 2013/0341012 A1* | 12/2013 | Belani | E21B 43/166 |
| | | | 166/250.12 |
| 2014/0305649 A1 | 10/2014 | Tang et al. | |
| 2015/0047847 A1 | 2/2015 | Mazyar et al. | |
| 2016/0115372 A1 | 4/2016 | Chakraborty et al. | |

OTHER PUBLICATIONS

International Search Report for International Application No. PCT/US15/55090 dated Jan. 26, 2016, 3 pages.

International Written Opinion for International Application No. PCT/US15/55090 dated Jan. 26, 2016, 8 pages.

Mazyar et al., U.S. Appl. No. 13/970,294, titled Conformable Materials Containing Heat Transfer Nanoparticles and Devices Made Using Same, filed Aug. 19, 2013.

Mazyar et al., U.S. Appl. No. 13/970,335, titled Apparatus and Methods for Stimultating Reservoirs Using Fluids Containing Nano/Micro Heat Transfer Elements, filed Aug. 19, 2013.

Mazyar et al., U.S. Appl. No. 14/074,910, titled Heat Exchange in Downhole Apparatus Using Core-Shell Nanoparticles, filed Nov. 8, 2013.

Mehling et al., Heat and Cold Storage with PCM, An Up to Date Introduction Into Basics and Applications, Heat and Mass Transfer ISSN: 18-60-4846, (2008), pp. 11-55.

Pop et al., Thermal properties of graphene: Fundamentals and applications, Material Research Society Bulletin, vol. 37, (Dec. 2012), pp. 1273-1281.

Sharma et al., Review on Thermal Energy Storage with Phase Change MAterial and Applications, Renewable and Sustainable Energy Review, vol. 13, (2009), pp. 318-345.

* cited by examiner

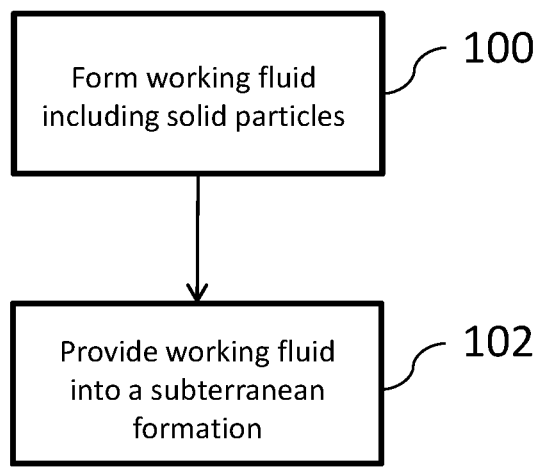

METHODS AND WORKING FLUIDS FOR RECOVERING A HYDROCARBON MATERIAL CONTAINED WITHIN A SUBTERRANEAN FORMATION

CROSS-REFERENCE TO RELATED APPLICATION

This application is a divisional of U.S. patent application Ser. No. 14/520,993, filed Oct. 22, 2014, abandoned, the disclosure of which is hereby incorporated herein in its entirety by this reference.

TECHNICAL FIELD

Embodiments of the disclosure relate generally to methods of recovering a hydrocarbon material contained within a subterranean formation, and to related working fluids. More particularly, embodiments of the disclosure relate to methods of recovering a hydrocarbon material from a subterranean formation using a working fluid including solid particles, and to related working fluids.

BACKGROUND

Enhanced hydrocarbon recovery includes processes for increasing the amount of hydrocarbon material (e.g., crude oil, natural gas, bitumen, etc.) recovered from a subterranean formation. Conventional processes of enhanced hydrocarbon recovery include water flooding, steam assisted gravity drainage, and steam flooding (e.g., cyclic steam stimulation). In such processes, a working fluid is injected into a subterranean formation through one or more injection wells to heat and/or sweep a hydrocarbon material contained within interstitial spaces (e.g., pores, cracks, fractures, channels, etc.) of the subterranean formation toward one or more production wells offset from the injection wells. Heating the hydrocarbon material may reduce the viscosity of the hydrocarbon material, facilitating the movement of the hydrocarbon material within and from the subterranean formation.

Disadvantageously, conventional enhanced hydrocarbon recovery processes may be ineffective at extracting significant amounts of hydrocarbon material within a subterranean formation. For example, in conventional steam flooding processes, the material properties (e.g., viscosity, material affinities and/or aversions, heat capacity, thermal conductivity, etc.) of the steam may prevent the steam from effectively penetrating into one or more regions (e.g., regions exhibiting low porosities and/or dead-end pores, regions progressively more distal from the injection well, etc.) of the subterranean formation, and/or from effectively heating and removing (e.g., displacing) hydrocarbon material from such regions of the subterranean formation.

It would, therefore, be desirable to have new methods and working fluids for extracting hydrocarbon material from a subterranean formation.

BRIEF SUMMARY

Embodiments described herein include methods of recovering a hydrocarbon material from a subterranean formation, as well as related working fluids. For example, in accordance with one embodiment described herein, a method of recovering a hydrocarbon material from a subterranean formation comprises forming a working fluid comprising substantially solid particles and an at least partially gaseous base material, the substantially solid particles exhibiting a greater heat capacity than the at least partially gaseous base material. The working fluid is introduced into a subterranean formation containing a hydrocarbon material to heat and remove the hydrocarbon material from the subterranean formation.

In additional embodiments, a method of recovering a hydrocarbon material from a subterranean formation comprises forming nanoparticles comprising at least one of graphite, graphene, fullerenes, diamond, nanofibers, clay, inorganic material, an organo-silicon material, and metal. The nanoparticles are combined with an at least partially gaseous base material comprising at least one of steam and carbon dioxide to form a working fluid. The working fluid is injected into a subterranean formation at a temperature greater than or equal to about 100° C. to heat and remove a hydrocarbon material contained within the subterranean formation.

In further embodiments, a working fluid comprises an at least partially gaseous base material and substantially solid particles dispersed and stabilized within the at least partially gaseous base material, the substantially solid particles each formulated to remain substantially solid up to a temperature of at least about 350° C. and each independently having a heat capacity of greater than or equal to about 0.1 kJ/kg-K.

BRIEF DESCRIPTION OF THE DRAWING

FIG. 1 is a simplified flow diagram depicting a method of recovering a hydrocarbon material from a subterranean formation, in accordance with embodiments of the disclosure.

DETAILED DESCRIPTION

Methods of recovering a hydrocarbon material from a subterranean formation are described, as are related working fluids. In some embodiments, a method of recovering a hydrocarbon material from a subterranean formation includes forming a working fluid comprising solid particles and a base material. The solid particles may be structured and formulated to impart the working fluid with improved properties (e.g., thermal energy storage properties, thermal energy transfer properties, viscosity properties, material affinity properties, surfactant properties, abrasive properties, etc.) relative to working fluids not including the solid particles. The working fluid may be delivered to an injection wellbore within a subterranean formation, and may infiltrate regions of the subterranean formation proximate the injection wellbore. As compared to conventional working fluids, the working fluid may more uniformly infiltrate the subterranean formation, may transfer thermal energy to a greater amount of hydrocarbon material contained within the subterranean formation, and may more effectively remove the hydrocarbon material from internal surfaces and interstitial spaces of the subterranean formation. The hydrocarbon material may then be flowed (e.g., driven, swept, forced, etc.) from the subterranean formation. The methods and working fluids of the disclosure may increase the simplicity and efficiency, and reduce the costs of recovering (e.g., extracting) a hydrocarbon material from a subterranean formation as compared to conventional extraction methods and working fluids.

The following description provides specific details, such as material types, stream compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow for recovering hydrocarbons from a hydrocarbon-bearing subterranean formation. Only those process acts and structures necessary to understand the embodiments of the disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. Also note, the drawing accompanying the application is for illustrative purposes only, and are thus not drawn to scale.

As used herein, the terms "comprising" "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawing and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

FIG. 1 is a simplified flow diagram illustrating a method of recovering a hydrocarbon material contained within a subterranean formation, in accordance with embodiments of the disclosure. The method may include a working fluid formation process 100 including forming a working fluid including a plurality of substantially solid particles, and an injection process 102 including providing the working fluid into a subterranean formation to heat, remove (e.g., detach, pull, etc.), and flow (e.g., drive, sweep, force, etc.) hydrocarbon material from surfaces and interstitial spaces of the subterranean formation. With the description as provided below, it will be readily apparent to one of ordinary skill in the art that the method described herein may be used in various applications. In other words, the method may be used whenever it is desired to extract a hydrocarbon material.

Referring to FIG. 1, the working fluid formation process 100 includes forming a working fluid including substantially solid particles, at least one base material, and, optionally, one or more additives. The solid particles of the working fluid may be compatible with the other components (e.g., materials, constituents, etc.) of the working fluid. As used herein, the term "compatible" means that a material does not undesirably react, decompose, or absorb another material, and also that the material does not undesirably impair the chemical and/or mechanical properties of the another material. For example, each of the solid particles may be structured (e.g., sized, shaped, layered, etc.) and formulated such that the solid particles do not substantially react with another material (e.g., an aqueous material, a hydrocarbon material, etc.) under the conditions (e.g., temperature, pressure, pH, flow rate, material exposure, etc.) in which the solid particles are provided into and removed from a subterranean formation.

The solid particles are structured and formulated to exhibit desirable thermal properties. For example, at least a portion of each of the solid particles may be formed of and include at least one material that efficiently stores thermal energy relative to the base material of the working fluid. The solid particles may, for example, exhibit relatively high sensible heat storage capacity, permitting the working fluid to maintain higher temperatures for prolonged periods of time relative to working fluids not including the solid particles. In addition, at least a portion of each of the solid particles may be formed of and include at least one material exhibiting relatively high thermal conductivity, permitting the working fluid to efficiently transfer thermal energy to another material (e.g., a hydrocarbon material within a subterranean formation). The ability of the solid particles to efficiently store and transfer thermal energy may permit the working fluid to increase the temperature and decrease the viscosity of a relatively greater amount of hydrocarbon material contained within a subterranean formation, enhancing extraction of hydrocarbon material from the subterranean formation.

In addition, the solid particles are structured and formulated to facilitate the formation of a stabilized working fluid. As used herein each of the terms "stabilized" and "stable" means that a dispersed phase (e.g., the solid particles) does not substantially settle, coalesce, flocculate, agglomerate, or precipitate over time. For example, the solid particles may be structured and formulated to remain substantially discretely (e.g., separately, individually, etc.) dispersed and suspended within the base material. Moreover, the solid particles may be structured and formulated to provide the working fluid with desired viscosity characteristics, such as increased viscosity relative to a working fluid without the solid particles. The increased viscosity of the working fluid comprising the solid particles may enhance the sweep efficiency of the working fluid relative to conventional working fluids. Such working fluid may infiltrate the subterranean formation more uniformly and/or more deeply to promote removal of hydrocarbon material therefrom. Additionally, the solid particles may be structured and formulated to impart the working fluid with pseudoplastic characteristics. For example, the solid particles may permit the working fluid to exhibit relatively higher viscosities at relatively lower shear rates and to exhibit relatively lower viscosities at relatively higher shear rates.

Furthermore, the solid particles are structured and formulated to facilitate the removal of hydrocarbon material from surfaces and interstitial spaces of a subterranean formation. For example, the solid particles may be structured and formulated to exhibit surfactant characteristics. The solid particles may lower surface tension between at least two other materials, such as between the base material and at least one of a liquid (e.g., an aqueous liquid, such as fresh water, seawater, produced water, brine, aqueous-based foams, and/or water-alcohol mixtures; an organic liquid, such as oil, tar, diesel, an ester, a refinery cut or blend, an alpha-olefin, a synthetic-based fluid; etc.) and a solid (e.g., rock, sand, shale, coal, etc.) present within and/or delivered to the subterranean formation. The solid particles may gather (e.g., agglomerate) at, adhere to, and/or adsorb to interfaces of the at least two other materials. As another example, the solid particles may be structured and formulated to modify capillary pressures within the subterranean formation to permit the working fluid to more deeply penetrate into and displace hydrocarbon material from capillaries (e.g., dead-end pores) within the subterranean formation as compared to working fluids not including the solid particles. As a further non-limiting example, at least a portion of the solid particles may be structured and formulated to be at least partially abrasive. As used herein, the term "abrasive" means that a structure (e.g., particle) is able to mar, scratch, scrape, gouge, abrade, and/or shear a material from a surface. The solid particles may abrasively remove hydrocarbon material from a surface of the subterranean formation upon contacting an interface of the hydrocarbon material and the subterranean formation.

Each of the solid particles may be formulated to remain in a substantially solid state at the temperature at which the working fluid is provided into the subterranean formation. For example, each of the solid particles may have a melting temperature greater than the temperature of the working fluid, such as a melting temperature greater than about 100° C. (e.g., greater than or equal to about 150° C., greater than or equal to about 200° C., greater than or equal to about 250° C., greater than or equal to about 300° C., or greater than or equal to about 350° C.). In some embodiments, the solid particles are formulated to remain substantially solid up to a temperature of at least about 350° C. In addition, at least a portion (e.g., each) of the solid particles may be formulated to exhibit a greater heat capacity than the base material of the working fluid. For example, at least a portion of the solid particles may have a heat capacity of greater than or equal to about 0.1 kilojoule per kilogram per Kelvin (kJ/kg-K) (e.g., greater than or equal to about 0.25 kJ/kg-K, greater than or equal to about 0.5 kJ/kg-K, greater than or equal to about 0.75 kJ/kg-K, greater than or equal to about 1.0 kJ/kg-K, etc.). Furthermore, at least a portion (e.g., each) of the solid particles may be formulated to exhibit a thermal conductivity of greater than or equal to about 50 Watts per meter per Kelvin (W/m-K), such as within a range of from about 50 W/m-K to about 1000 W/m-K (e.g., from about 75 W/m-K to about 900 W/m-K, from about 100 W/m-K to about 800 W/m-K, from about 150 W/m-K to about 700 W/m-K, from about 200 W/m-K to about 600 W/m-K, etc.). By way of non-limiting example, the solid particles may be formed of and include at least one of graphite, graphene, fullerenes, diamond, nanofibers, clay, inorganic material, an organo-silicon material, and metal.

In some embodiments, at least a portion of the solid particles are formed of and include graphite particles. As used herein, "graphite" refers to a cluster of plate-like sheets of fused hexagonal carbon rings with an extended delocalized n-electron system. The cluster may comprise a stack of the plate-like sheets layered and weakly bonded to one another through x-n stacking interaction. The graphite particles may each independently be formed of and include greater than or equal to about 50 of the plate-like sheets, such as greater than or equal to about 100 of the plate-like sheets, or greater than or equal to about 500 of the plate-like sheets.

In additional embodiments, at least a portion of the solid particles are formed of and include graphene particles. As used herein, "graphene" refers to at least one plate-like sheet of fused hexagonal carbon rings with an extended delocalized π-electron system. Multiple plate-like sheets may be layered and weakly bonded to one another through π-π stacking interaction. The graphite particles may each independently may be formed of and include less than about 50 of the plate-like sheets, such as less than or equal to about 10 of the plate-like sheets, less than or equal to about 5 of the plate-like sheets, or even only 1 of the plate-like sheets.

In additional embodiments, at least a portion of the solid particles are formed of and include fullerenes. As used herein, "fullerenes" refer any of the known cage-like hollow allotropic forms of carbon possessing a polyhedral structure. Fullerenes may include from about 20 carbon atoms to about 100 carbon atoms. Non-limiting examples of suitable fullerenes include $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, and $C_{76}$.

In additional embodiments, at least a portion of the solid particles are formed of and include nanofibers. As used herein, "nanofiber" means and includes an elongated structure having a cross-section or diameter of less than one micron, such less than or equal to about 500 nanometers (nm). Nanofibers include structures that are hollow (e.g., nanotubes), and structures that are substantially free of void spaces. In some embodiments, the nanofibers may comprise carbon nanofibers (e.g., carbon nanotubes), inorganic nanofibers (e.g., boron nitride nanotubes, boron carbide nanotubes, aliuminum nanotubes, cadmium sulfide nanotubes, carbon nitride nanotubes, titania nanotubes, silicon nanotubes, or silicon dioxide nanotubes), metallated nanofibers (e.g., at least one of carbon nanofibers and inorganic nanofibers including doped and/or coated with at least one of a metal and a metalloid), or combinations thereof. If at least some of the nanofibers are nanotubes, the nanotubes may comprise single walled nanotubes (SWNTs), multi-walled nanotubes (MWNTs), or a combination thereof.

In additional embodiments, at least a portion of the solid particles are formed of and include diamond particles. The diamonds may comprise natural diamonds, synthetic diamonds, or a combination thereof. The diamonds may, optionally, be cleaned prior to being incorporated into the working fluid to remove contaminants and/or non-diamond carbon phases present, such as residues of amorphous carbon and/or graphite.

In additional embodiments, at least a portion of the solid particles are formed of and include clay particles. As used herein, "clay" refers to a hydrated or anhydrous silicate mineral exhibiting a layered structure. Non-limiting examples of suitable clays include alumino-silicate clays, such as kaolins (e.g., hallyosite), smectites (e.g., montmorillonite), and illites. The clay may be exfoliated to separate individual layers (e.g., sheets) thereof, may be non-exfoliated, or may be a combination thereof.

In additional embodiments, at least a portion of the solid particles are formed of and include inorganic particles.

Non-limiting examples of suitable inorganic particles include metal carbides (e.g., tungsten carbide), metalloid carbides (e.g., silicon carbide, boron carbide, etc.), metal nitrides (e.g., titanium nitride), metalloid nitrides (e.g., boron nitride, silicon nitride, etc.), metal oxides (e.g., titanium oxide, alumina, tungsten oxide, iron oxides, etc.), metalloid oxides (e.g., silicon oxides), metal oxynitrides, metalloid oxynitrides, or combinations thereof.

In additional embodiments, at least a portion of the solid particles are formed of and include organo-silicon particles. As used herein, "organo-silicon" materials refer to materials including carbon-silicon bonds. Suitable organo-silicon materials include organo-silicate materials, organo-siloxane materials, and organo-silsesquioxane materials. By way of non-limiting example, one or more of the solid particles may be formed of and include a polyhedral oligomeric silsesquioxane (POSS).

In additional embodiments, at least a portion of the solid particles are formed of and include metal particles. Suitable metals may include alkali metals, alkaline earth metals, transition metals, and post-transition metals, alloys thereof, or combinations thereof. By way of non-limiting example, one or more of the solid particles may be formed of and include iron (Fe), tin (Sn), titanium (Ti), platinum (Pt), palladium (Pd), cobalt (Co), nickel (Ni), vanadium (V), alloys thereof, or combinations thereof.

At least some of the solid particles may comprise composite particles. As used herein, the term "composite particle" means and includes a particle including at least two constituent materials that remain distinct on a micrometric level while forming a single particle. For example, the composite particle may include a core of a first material at least partially encapsulated (e.g., covered, surrounded, etc.) by a shell of a second material. In some embodiments, the core may exhibit different thermal properties (e.g., heat capacity, thermal conductivity, etc.) properties than the shell. The core may, for example, be formed of and include a material exhibiting first heat capacity, and the shell may be formed of and include another material exhibiting a second, different heat capacity. The heat capacity of the core may be higher than the heat capacity of the shell, lower than the heat capacity of the shell, or a combination thereof. In additional embodiments, the core may be formed of and include a material exhibiting a first thermal conductivity, and the shell may be formed of and include another material exhibiting a second, different thermal conductivity. The thermal conductivity of the core may be higher than the thermal conductivity of the shell, lower than the thermal conductivity of the shell, or a combination thereof. In some embodiments, the core is formed of and includes at least one material selected from graphite, graphene, a fullerene, diamond, nanofiber, clay, inorganic material, organo-silicon material, and metal, and the shell is formed of and includes at least one other material selected from graphite, graphene, fullerene, diamond, nanofiber, clay, inorganic material, organo-silicon material, and metal. If present, the shell may be formed on or over the core using conventional processes. For example, the shell may be formed on or over the core through at least one of a thermal decomposition process, a chemical vapor deposition (CVD) process, a physical vapor deposition (PVD) process (e.g., sputtering, evaporation, ionized PVD, etc.), an atomic layer deposition (ALD) process, and a physical mixing process (e.g., cryo-milling, ball milling, etc.).

At least some of the solid particles may include functional groups formulated to maintain a stable dispersion of the solid particles in the base material at the temperatures and pressures at which the working fluid is provided into a subterranean formation, to impart the working fluid with pseudoplastic characteristics, to impart the solid particles with surfactant characteristics (e.g., so as to affect capillary pressures within a hydrocarbon-bearing subterranean formation), to limit and/or enhance interactions between the solid particles and different materials present within a hydrocarbon-bearing subterranean formation, or a combination thereof. The solid particles may, for example, be functionalized (e.g., through the inclusion of one or more functional groups) to be at least partially hydrophilic, hydrophobic, amphiphilic, organophilic, oxophilic, lipophilic, and/or oleophilic. Various affinities may assist with the dispersion of the solid particles within the base material of the working fluid, and may also assist with the removal of hydrocarbon material from surfaces and/or interstitial spaces of the subterranean formation. As a non-limiting example, hydrophilic functional groups may enable the solid particles to be more readily dispersed and stabilized in an aqueous base material (e.g., steam), whereas organophilic functional groups may enable the solid particles to be more readily dispersed and stabilized in an organic base material (e.g., carbon dioxide). As another non-limiting example, solid particles functionalized to exhibit an affinity for at least one of a hydrocarbon material and an internal surface of a subterranean formation may permit the solid particles to gather (e.g., agglomerate) and influence (e.g., decrease) surface tension at interfaces of the hydrocarbon material and the internal surface of a subterranean formation to assist with removal of the hydrocarbon material from the internal surface of the subterranean formation. Any portions (e.g., cores, shells, etc.) of the solid particles may be functionalized to exhibit desired affinities and/or aversions for different materials. In further embodiments, at least some of the solid particles are formulated to exhibit desired affinities and/or aversions for different materials without having to perform additional processing acts to attach functional groups thereto. For example, one or more portions (e.g., shells, cores, etc.) of at least some of the solid particles may already exhibit desired affinities and/or aversions for different materials without having to perform additional functionalization acts.

Non-limiting examples of suitable functional groups for modifying the affinities and/or aversions of the solid particles for different materials include acid groups; hydroxy groups; carboxy groups; glycol groups; ionic groups; epoxy groups, ether groups; ketone groups; amine groups; alkoxy groups; alkyl groups, such as methyl, ethyl, propyl, butyl, pentyl, hexyl, octyl, dodecyl, and/or octadecyl groups; aryl groups, such as phenyl, and/or hydroxyphenyl groups; aralkyl groups; alkaryl groups, such as benzyl groups attached via the aryl portion (e.g., 4-methylphenyl, 4-hydroxymethylphenyl, or 4-(2-hydroxyethyl)phenyl, and/or aralkyl groups attached at the benzylic (alkyl) position, such as in phenylmethyl and 4-hydroxyphenylmethyl groups, and/or attached at the 2-position, such as in phenethyl and 4-hydroxyphenethyl groups); lactone groups; functionalized polymeric groups, such as acrylic chains having carboxylic acid groups, hydroxyl groups, and/or amine groups; functionalized oligomeric groups; and/or combinations thereof.

Substantially all of the solid particles may be independently functionalized, or less than all of the solid particles may be independently functionalized. By way of non-limiting example, between about 0 weight percent (wt %) and about 50 wt % of the solid particles may be independently functionalized (e.g., between about 0 wt % and about 5 wt %, between about 5 wt % and about 10 wt %, between about 10 wt % and about 20 wt %, between about 20 wt % and about 50 wt %, etc.) and remaining solid particles may be unfunctionalized. In addition, each of the functionalized solid particles may independently exhibit a desired degree (e.g., amount, density, etc.) of functionalization. By way of non-limiting example, each functionalized solid particle may independently exhibit from about 1 functional group per 5 surface atoms (e.g., surface carbon atoms) of the solid particle to about 1 functional group per 100 surface atoms of the solid particle.

The functional groups may be attached to the solid particles directly, and/or through intermediate functional groups (e.g., carboxy groups, amino groups, etc.) by way of one or more conventional reaction mechanisms (e.g., amination, nucleophilic substitution, oxidation, Stille coupling, Suzuki coupling, diazo coupling, organometallic coupling, etc.). Optionally, at least some of the solid particles may be pretreated prior to being functionalized. By way of non-limiting example, at least some of the solid particles (e.g., graphite particles, graphene particles, etc.) may be exfoliated (e.g., expanded) prior to being functionalized. The exfoliation process may, for example, include subjecting the solid particles to at least one of fluorination, acid intercalation (e.g., Brønsted acid intercalation, such as phosphoric acid intercalation, sulfuric acid intercalation, dichloroacetic acid intercalation, alkylsulfonic acid intercalation, etc.), and thermal treatment (e.g., thermal shock treatment).

Each of the solid particles may have substantially the same surface modification (e.g., shell, surface functionalization, combinations thereof, etc.), the surface modification of at least one of the solid particles may be different than the surface modification of at least one other of the solid particles, or at least one of the solid particles may have substantially no surface modification. In some embodiments, each of the solid particles has substantially the same surface modification. In additional embodiments, a portion of the solid particles have substantially the same surface modification, and another portion of the solid particles have a different surface modification. In further embodiments, a portion of the solid particles have at least one type of surface modification, and another portion of the solid particles are substantially free of surface modifications.

The size and shape of each of the solid particles may be selected based on the characteristics of the subterranean formation. For example, the solid particles may be sized and shaped to fit within interstitial spaces (e.g., pores, capillaries, cracks, fractures, channels, etc.) of the subterranean formation. In addition, the solid particles may be sized and shaped based on one or more properties (e.g., molecular weight, density, viscosity, etc.) of the base material of the working fluid and of a hydrocarbon material contained within the interstitial spaces of the subterranean formation. In some embodiments, the solid particles may comprise nanoparticles. As used herein the term "nanoparticle" means and includes a particle having an average particle width or diameter of less than about 1 micrometer (μm) (i.e., 1000 nanometers). Each of the solid particles may, for example, independently have an average particle width or diameter of less than or equal to about 750 nm, such as less than or equal to about 500 nm, less than or equal to about 250 nm, less than or equal to about 100 nm, less than or equal to about 50 nm, or less than or equal to about 20 nm. In additional embodiments, one or more of the solid particles may have an average particle width or diameter greater than or equal to about 1 μm, such as within a range of from about 1 μm to about 25 μm, from about 1 μm to about 20 μm, or from about 1 μm to about 10 μm. The solid particles may exhibit a very high surface area, such as a surface area within a range of from about 300 meters squared per gram ($m^2/g$) to about 1800 $m^2/g$. Furthermore, each of the solid particles may independently exhibit a desired shape, such as at least one of a spherical shape, a hexahedral shape, an ellipsoidal shape, a cylindrical shape, a tubular shape, a conical shape, or an irregular shape. In embodiments wherein one or more of the solid particles exhibits an elongate shape, such as a cylindrical shape and/or a tubular shape, an aspect ratio (e.g., length to diameter ratio) of each of the one or more solid particles may independently be within a range of from about 1:10 to about 1000:1, such as from about 1:10 to about 500:1, from about 1:10 to about 200:1, or from about 1:10 to about 100:1.

The solid particles may be monodisperse, wherein each of the solid particles has substantially the same size, shape, and material composition, or may be polydisperse, wherein the solid particles include a range of sizes, shapes, and/or material compositions. In some embodiments, the solid particles are substantially monodisperse. In additional embodiments, the solid particles are substantially polydisperse.

The amount of the solid particles in the working fluid may be tailored to the amount and material composition of the hydrocarbon material contained within the subterranean formation. The working fluid may include a sufficient amount of the solid particles to facilitate the heating and removal of the hydrocarbon material from the subterranean formation. In addition, the working fluid may include a sufficient amount of the solid particles for the working fluid to comprise a stabilized dispersion of the solid particles in the base material. By way of non-limiting example, the working fluid may comprise from about 0.01 wt % solid particles to about 20.0 wt % solid particles, such as from about 0.05 wt % solid particles to about 10.0 wt % solid particles, from about 0.05 wt % solid particles to about 5.0 wt % solid particles, or from about 0.05 wt % solid particles to about 2.0 wt % solid particles. In some embodiments, the working fluid comprises from about 0.05 wt % solid particles to about 2.0 wt % solid particles.

The base material of the working fluid may comprise any flowable material (e.g., fluid) that is compatible with the solid particles of the working fluid. The base material may comprise a gaseous material, a liquid material, or a combination thereof. In some embodiments, the base material comprises an at least partially (e.g., substantially) gaseous material. The base material may be substantially gaseous at atmospheric pressure (e.g., about 101.325 kilopascal). The base material may, for example, comprise at least one of an aqueous material (e.g., steam), an organic material (e.g., carbon dioxide, natural gas, ethane, butane, vapors of an organic solvent), and an inorganic material (e.g., nitrogen). The base material may exhibit material properties (e.g., viscosity, heat capacity, thermal conductivity, etc.) that, in combination with the material properties (e.g., size, shape, heat capacity, thermal conductivity, etc.) and quantity of the solid particles, enables the working fluid to exhibit material properties (e.g., viscosity, heat capacity, thermal conductivity, etc.) facilitating the relatively enhanced infiltration of the working fluid into a subterranean formation as well as the relatively enhanced heating and removal of hydrocarbon material contained within the subterranean formation. In some embodiments, the base material comprises steam. In additional embodiments, the base material comprises carbon dioxide ($CO_2$).

In addition, the working fluid may, optionally, include at least one additive. By way of non-limiting example, the additive may be at least one of a surfactant, a filler material, a dispersant, a scale inhibitor, a scale dissolver, a defoamer, a biocide, and/or a different additive conventionally utilized in the well service industry. The type and amount of the additive may at least partially depend on the properties of the solid particles, on the properties of the base material, on the properties of the subterranean formation, and on the properties of the hydrocarbon material contained within the subterranean formation. Individual units (e.g., particles, fibers) of the additive may range from micro-sized (e.g., having a cross-sectional width or diameter greater than or equal to about one micrometer) to nano-sized (e.g., having a cross-sectional width or diameter less than about one micrometer, such as less than or equal to about 500 nanometers), and may each independently have a desired shape (e.g., a spherical, hexahedral, ellipsoidal, cylindrical, tubular, conical, or irregular shape).

In some embodiments, the additive comprises at least one surfactant. The surfactant may comprise any anionic surfactant, non-ionic surfactant, or cationic surfactant compatible with hydrocarbon material contained within the subterranean formation and also compatible with the other components (e.g., the solid particles, the base material, etc.) of the working fluid. Non-limiting examples of suitable surfactants include fatty acids having a carbon chain length of up to about 22 carbon atoms, such as stearic acids, and esters thereof; poly(alkylene glycols), such as poly(ethylene oxide), poly(propylene oxide), and block and random poly(ethylene oxide-propylene oxide) copolymers; and polysiloxanes, such as homopolymers and copolymers of poly(dimethylsiloxane).

In additional embodiments, the additive comprises at least one filler material. The filler material may be a material formulated and configured to enhance at least one property (e.g., viscosity, heat capacity, thermal conductivity, etc.) of the working fluid. Suitable filler materials include, but are not limited to, carbon-based fillers (e.g., carbon black), slagwool fillers (magnesium calcium aluminum silicates), cellulose fillers, ZYLON® fillers, clay fillers, glass fillers, and silica fillers.

A temperature to which the working fluid may be elevated prior to injection into a hydrocarbon-bearing subterranean formation may be selected based on the environmental conditions (e.g., materials, porosity, temperature, etc.) of the target subterranean formation. The working fluid may exhibit a temperature sufficient for the working fluid to infiltrate (e.g., permeate, flood, etc.) regions of a subterranean formation adjacent an injection well and heat hydrocarbon material contained therein so as to sufficiently mobilize the hydrocarbon material so that the hydrocarbon material may be extracted from the subterranean formation. The temperature of the working fluid may also be controlled to maintain the solid particles in a substantially solid state, and to maintain a stable dispersion of the solid particles within the base material. For example, the working fluid may exhibit a temperature of greater than or equal to about 100° C., such as within a range of from about 100° C. to about 350° C. At least one of the solid particles and the base material may be heated and then the solid particles and the base material may be combined (e.g., mixed) to form the working fluid, the solid particles and the base material may be combined and then heated to form the working fluid, or a combination thereof.

With continued reference to FIG. 1, the injection process 102 includes introducing the working fluid into a subterranean formation containing a hydrocarbon material. The working fluid may be provided into the subterranean formation through conventional processes. For example, a pressurized stream of the working fluid may be pumped (e.g., by way of a wellhead unit) into an injection well extending to a desired depth within the subterranean formation, and may infiltrate (e.g., permeate, diffuse, etc.) into interstitial spaces of the subterranean formation, wherein the working fluid may at least partially interact with (e.g., physically contact, heat, etc.) the hydrocarbon material contained therein. The pressure of the working fluid (as well as the temperature) may be controlled to maintain a stable dispersion of the solid particles in the base material during the injection process 102.

The extent to which the working fluid infiltrates into the interstitial spaces of the subterranean formation at least partially depends the properties of the working fluid (e.g., viscosity, solid particle size, temperature, pressure, etc.), the subterranean formation (e.g., porosity, pore size, material composition, etc.), and the hydrocarbon material (e.g., molecular weight, density, viscosity, etc.) contained within the interstitial spaces of the subterranean formation. A unit volume of the working fluid containing the solid particles may exhibit increased viscosity relative to a unit volume of the base material alone, permitting the working fluid to penetrate more uniformly into the subterranean formation. In addition, the properties (e.g., functionalities, affinities, etc.) of the solid particles permit a unit volume of the working fluid containing the solid particles to penetrate more deeply into interstitial spaces of the subterranean formation relative to a unit volume of the base material alone, enhancing interactions (e.g., physical contact, heat transfer, etc.) between the working fluid and the hydrocarbon material.

The working fluid may displace the hydrocarbon material from the interstitial spaces of the subterranean formation. Thermal energy transferred from the working fluid (e.g., from the solid particles and the base fluid) to the hydrocarbon material may reduce the viscosity of the hydrocarbon material and increase the movability of the hydrocarbon material. A unit volume of the working fluid containing the solid particles may exhibit enhanced thermal properties (e.g., increased heat capacity, increased thermal conductivity, etc.) relative to a unit volume of the base material alone, providing relatively more thermal energy to the hydrocarbon material. In addition, at least the solid particles of the working fluid may modify capillary pressures within the subterranean formation to facilitate extraction (e.g., withdrawal) of the hydrocarbon material from dead-end pores within the subterranean formation. Moreover, at least the solid particles of the working fluid may abrade hydrocarbon material from surfaces of the subterranean formation upon contacting an interface of the hydrocarbon material and the subterranean formation.

The injection process 102 may drive (e.g., sweep, force, push, etc.) the hydrocarbon material from the subterranean formation. For example, the working fluid may drive the hydrocarbon material from the interstitial spaces of the subterranean formation toward at least one production wellbore. The hydrocarbon material may be received by the production wellbore, flowed therefrom, and then subjected to one or more processes (e.g., reaction processes, filtration processes, precipitation processes, settling processes, etc.) to separate, collect, and/or further process the hydrocarbon material. The hydrocarbon material may be utilized as desired.

The methods and working fluids of the disclosure may facilitate the efficient extraction of hydrocarbon material from a subterranean formation. The working fluid of the disclosure, including the solid particles and the base material, may exhibit favorable properties (e.g., thermal energy storage properties, thermal energy transfer properties, viscosity properties, material affinity properties, surfactant properties, etc.) as compared to conventional working fluids, enhancing the removal of the hydrocarbon material from internal surfaces and interstitial spaces of the subterranean formation as well as the movement of the hydrocarbon material within and from the subterranean formation.

While the disclosure is susceptible to various modifications and alternative forms, specific embodiments have been shown by way of example in the drawing and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A method of recovering a hydrocarbon material from a subterranean formation, comprising:
    subjecting preliminary substantially solid particles to at least one exfoliation process to form expanded, preliminary substantially solid particles;
    attaching functional groups to surfaces of the expanded, preliminary substantially solid particles to form substantially solid particles, the functional groups selected to promote the formation of a substantially stable dispersion of the substantially solid particles within carbon dioxide gas;
    forming a working fluid comprising the substantially stable dispersion of the substantially solid particles within the carbon dioxide gas, the substantially solid particles exhibiting a greater heat capacity than the carbon dioxide gas; and
    introducing the working fluid into a subterranean formation containing a hydrocarbon material to heat and remove the hydrocarbon material from the subterranean formation.

2. The method of claim 1, wherein attaching functional groups to surfaces of the expanded, preliminary substantially solid particles comprises selecting the functional groups so that the substantially solid particles exhibit surfactant characteristics.

3. The method of claim 1, further comprising forming the substantially solid particles to exhibit a surface area within a range of from about 300 $m^2/g$ to about 1800 $m^2/g$.

4. The method of claim 1, wherein forming a working fluid comprises forming the working fluid to comprise from about 0.05 percent by weight to about 20.0 percent by weight of the substantially solid particles.

5. The method of claim 1, wherein introducing the working fluid into a subterranean formation comprises introducing the working fluid into the subterranean formation at a temperature within a range of from about 100° C. to about 350° C.

6. The method of claim 1, further comprising selecting at least some of the substantially solid particles to individually comprise a core of a first material at least partially surrounded by a shell of a second material.

7. A method of recovering a hydrocarbon material from a subterranean formation, comprising:
    forming nanoparticles comprising at least one of graphite, graphene, fullerenes, diamond, nanofibers, clay, inorganic material, an organo-silicon material, and metal;
    expanding the nanoparticles through one or more of fluorination, Brønsted acid intercalation, and thermal shock treatment;
    attaching functional groups to the expanded nanoparticles to form functionalized nanoparticles formulated to remain stably dispersed in carbon dioxide gas at a temperature within a range of from about 100° C. to about 350° C.;
    combining the expanded nanoparticles with carbon dioxide gas to form a working fluid; and
    injecting the working fluid into a subterranean formation at the temperature within the range of from about 100° C. to about 350° C. to heat and remove a hydrocarbon material contained within the subterranean formation.

8. The method of claim 7, wherein forming nanoparticles comprises forming the nanoparticles to have a heat capacity of greater than or equal to about 0.1 kJ/kg-K, and to have a thermal conductivity of greater than or equal to about 50 W/m-K.

9. The method of claim 7, wherein forming nanoparticles comprises forming graphene nanoparticles.

* * * * *

UNITED STATES PATENT AND TRADEMARK OFFICE
CERTIFICATE OF CORRECTION

PATENT NO.        : 10,344,203 B2
APPLICATION NO.   : 15/719926
DATED             : July 9, 2019
INVENTOR(S)       : Soma Chakraborty and Michael H. Johnson Page 1 of 1

It is certified that error appears in the above-identified patent and that said Letters Patent is hereby corrected as shown below:

In the Specification

| | | |
|---|---|---|
| Column 3, | Line 18, | change ""comprising" "including,"" to --"comprising," "including,"-- |
| Column 6, | Line 3, | change "n-electron system" to --π-electron system-- |
| Column 6, | Line 5, | change "x-n stacking" to --π-π stacking-- |
| Column 8, | Line 46, | change "groups, ether groups;" to --groups; ether groups;-- |

Signed and Sealed this
Twenty-seventh Day of August, 2019

Andrei Iancu
*Director of the United States Patent and Trademark Office*